United States Patent [19]
Panepinto

[11] Patent Number: 6,095,888
[45] Date of Patent: Aug. 1, 2000

[54] TURKEY CALL WITH GLARE RESISTANT STRIKING SURFACE

[75] Inventor: John J. Panepinto, Venetia, Pa.

[73] Assignee: Creative Woodcrafts Inc., Venetia, Pa.

[21] Appl. No.: 09/055,200

[22] Filed: Apr. 3, 1998

[51] Int. Cl.[7] .............................. A63H 5/00; G10D 13/08
[52] U.S. Cl. ........................... 446/397; 446/418; 84/410
[58] Field of Search .................................. 446/397, 418; 84/411 R, 410, 294

[56] References Cited

U.S. PATENT DOCUMENTS

| | | | |
|---|---|---|---|
| D. 312,426 | 11/1990 | Battey ..................................... | D10/116 |
| 1,654,592 | 1/1928 | Lockwood ............................. | 84/411 R |
| 4,586,912 | 5/1986 | Adams .................................... | 446/397 |
| 5,066,260 | 11/1991 | Lindler .................................... | 446/397 |
| 5,178,575 | 1/1993 | Koch ....................................... | 446/397 |
| 5,527,526 | 6/1996 | Wesley .................................... | 446/397 |
| 5,562,521 | 10/1996 | Butler et al. ........................... | 446/397 |
| 5,585,579 | 12/1996 | Ignatius .................................... | 84/410 |

*Primary Examiner*—Robert A. Hafer
*Assistant Examiner*—Laura Fossum
*Attorney, Agent, or Firm*—Brij K. Agarwal; Benjamin T. Queen, II; Eckert Seamans Cherin & Mellott, LLC

[57] ABSTRACT

A turkey call includes a housing and a striking plate for producing artificial turkey sounds when the striking plate is contacted by and moved relative to a rigid striking member that is moved relative thereto. The striking plate is preferably formed of an aluminum and includes a glare resistant striking surface. The glare resistant striking surface may also include a plurality of concentric grooves formed therein to allow for a more consistent turkey sound to be produced, even during adverse weather conditions.

7 Claims, 2 Drawing Sheets

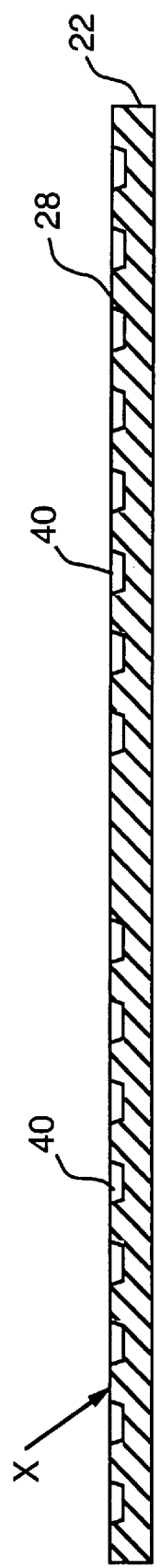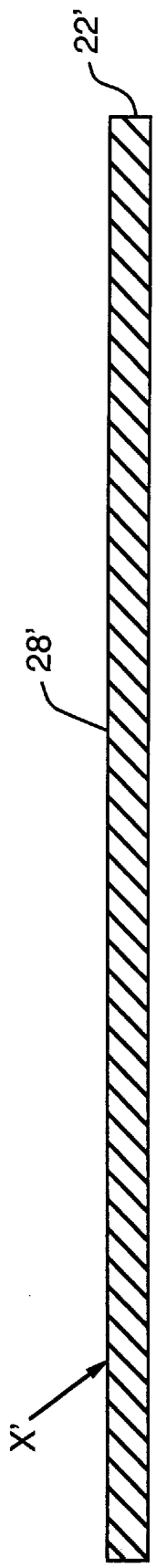

TURKEY CALL WITH GLARE RESISTANT STRIKING SURFACE

BACKGROUND OF THE INVENTION

1. Field of the Invention

The present invention relates to turkey calls, and more particularly, to turkey calls having a glare resistant striking surface.

2. Description of the Prior Art

Many types of turkey calls are known in the art. For example, there are "box" type turkey calls, "diaphragm" type turkey calls, and turkey calls which include a striking plate that produces artificial turkey sounds due to contact by and relative movement with a rigid striking rod or striking member.

As to the type of turkey call having a striking plate and a striking member, typically the striking plate is formed of slate, glass or a metal, such as, for example, aluminum, in order to best obtain the desired artificial turkey sounds. Among the problems encountered with turkey calls having such striking plates formed of a metal is that typically the metal is shiny and reflective. This is particularly true when aluminum is used to form the striking plate. As can be appreciated, a turkey call having a shiny and reflective striking plate can be disadvantageous to a hunter using the same. For example, sunlight may reflect off of the striking plate and reveal the hunters presence to the turkey, or other game, being hunted.

In addition, turkey calls having such striking plates, i.e., formed of a metal, typically include a striking plate that is generally smooth. This makes it difficult for the user of the turkey call to consistently obtain the desired turkey sounds. Furthermore, a striking plate with a generally smooth surface makes it difficult to use the turkey call during adverse weather conditions, such as rain or snow. For example, the rain or melted snow is retained on the smooth surface of the striking plate and prevents the desired turkey sounds from being produced.

U.S. Pat. No. 4,586,912 discloses a game call having a glass striking surface that may be roughened by sandblasting or etching. Such roughening of the surface makes it difficult to consistently obtain the desired sounds due to the variations in the surface roughness and when using the game call in adverse weather conditions.

There remains, therefore, a need for an improved turkey call, and in particular, an improved striking plate that does not have a shiny and reflective striking surface. There is also a need for an improved striking plate that allows for desired turkey sounds to be produced consistently, and which can be produced in all types of weather conditions.

SUMMARY OF THE INVENTION

The present invention has solved the above-described problems by providing a turkey call with an improved striking plate. Specifically, the turkey call includes a housing having a base and a sidewall extending from said base which define a sound chamber. The sidewalls terminate in a free edge wherein the free edge defines an opening of the housing. The striking plate is configured to be received in the opening of the housing. By contacting the striking plate with a rigid striking member and moving the striking member relative thereto, artificial turkey sounds can be produced.

One feature of the invention is that the striking plate has a glare resistant striking surface. Advantageously, this prevents, for example, sunlight from reflecting off of the striking surface of the turkey call and revealing the user's position to the turkey or other game that is being sought. The glare resistant striking surface may preferably be obtained by anodizing the striking surface of the striking plate. The striking plate is preferably made of aluminum. The glare resistant striking surface may be established by applying a glare resistant coating to the striking surface during the anodization process.

Another feature of the invention is to provide the glare resistant striking surface with a plurality of concentric grooves formed therein. In a preferred embodiment, the plurality of concentric grooves are circular. Advantageously, the grooves formed in the striking surface allow for a more consistent sound to be obtained from the turkey call. Further, the grooves allow for the turkey call to be used in all types of weather conditions.

It is an object of the present invention to provide an improved turkey call having a striking plate with a glare resistant striking surface.

It is a further object of the present invention to provide an improved turkey call where the striking surface of the striking plate is grooved to provide a more consistent turkey sound.

It is also an object of the invention to provide a turkey call that can effectively be used in all weather conditions.

It is an object of the invention to provide a turkey call that is durable, easy to use, and can be economically manufactured.

These and other objects of the invention will be more fully understood from the following description of the invention with reference to the drawings appended hereto.

BRIEF DESCRIPTION OF THE DRAWINGS

FIG. 3 is a sectional view taken along line 3—3 of FIG. 1.

FIG. 4 is a sectional view similar to FIG. 3 but showing another embodiment of the striking plate of the invention.

DESCRIPTION OF THE PREFERRED EMBODIMENT

As used herein the term "dark color" means the colors including, but not limited to, black, dark blue, dark brown or variations, combinations and assortments thereof which will have low light reflecting properties.

As used herein the term "glare resistant coating" means any surface which through color would resist or inhibit the normal light reflecting properties of the exposed metal surface through use of dark colors as defined herein.

As used herein, "aluminum" refers to and includes substantially pure aluminum and aluminum alloys.

Figure 1:
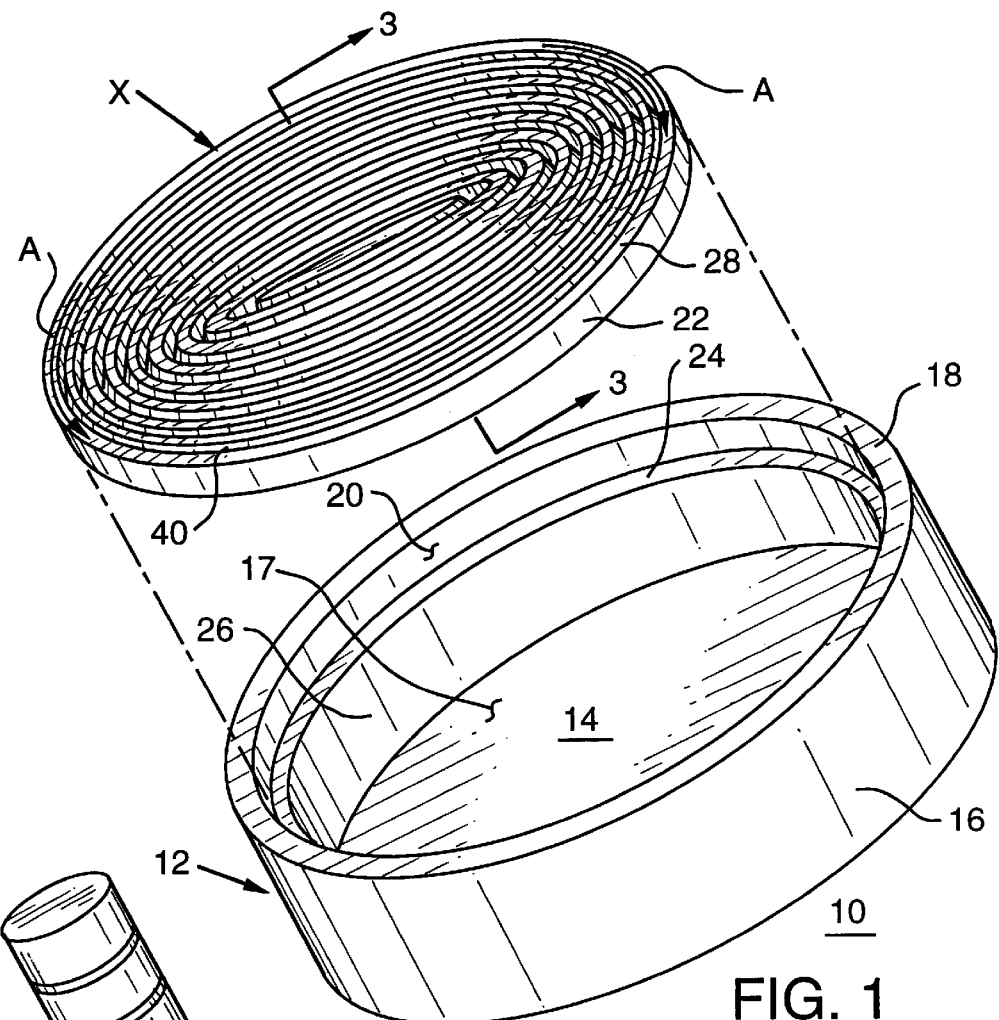
FIG. 1 is an exploded isometric view showing a turkey call of the invention.

Referring to FIG. 1 there is shown a turkey call 10 of the invention. The turkey call 10 includes a housing 12 having a base 14 and a sidewall 16 extending from the base 14. The base 14 and sidewall 16 define a sound chamber 17. The sidewall 16 terminates in a free edge 18 which defines an opening 20. The housing 12 may be formed of plastic, carbon or wood, or any other suitable material, as is known. It will be appreciated that the shape of the housing 12, as shown in FIG. 1, is for illustrative purposes only and that other shapes may be utilized to make the housing 12.

The turkey call 10 further includes a striking plate 22 which is configured to be received in the opening 20 of the housing 12. In the preferred embodiment, the housing 12 includes a shoulder 24 circumferentially disposed about an inner wall 26 of the housing 12. The striking plate 22 is preferably permanently affixed to the housing 12 and specifically to the shoulder 24 using, for example, a known mechanical fastening means or an adhesive (not shown). Preferably the striking plate 22 encloses the sound chamber 17.

Figure 2:
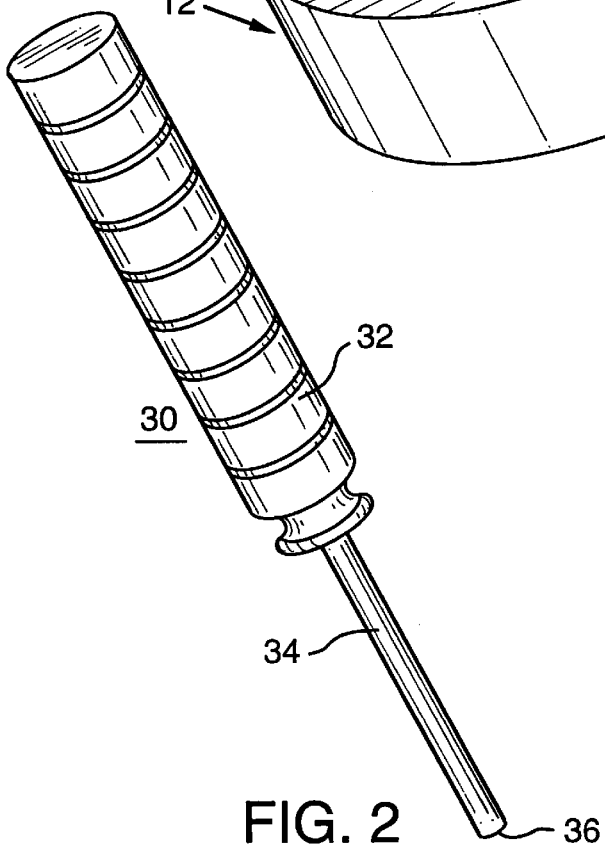
FIG. 2 is an isometric view of a rigid striking member which is used in conjunction with the turkey call shown in FIG. 1 to produce turkey sounds.

In accordance with one aspect of the invention, the striking plate 22 includes a glare resistant striking surface 28. The glare resistant striking surface 28 provides for the production of artificial turkey sounds when the glare resistant striking surface 28 is contacted by a rigid striking member 30, shown in FIG. 2, that is moved relative to the striking surface 28 as is generally known. Specifically, the rigid striking member 30 includes a handle end 32 and a striking rod 34 having a striking end 36 that actually contacts the glare resistant striking surface 28 to produce the desired turkey sounds. Preferably, the striking end 36 of the rigid striking member 30 is placed on the glare resistant striking surface 28 and moved in a circular manner, as indicated by arrows A, to obtain the desired turkey sounds. The handle end 32 may be made of wood, metal, plastic or any other suitable material. The striking rod 34 and striking end 36 are preferably made of wood, but may be made of other suitable materials such as glass and carbon.

The striking plate 22 may be made of a material selected from the group consisting of aluminum, stainless steel, and other suitable metals or composite materials. Preferably, the striking plate 22 is made of aluminum, such as, for example, 5052-H34 aluminum. Advantageously, by providing for a glare resistant striking surface 28, the otherwise shiny and reflective surface of the striking plate 22 is eliminated. This allows for the user of the turkey call 10 to more effectively use the turkey call while hunting turkey or other game. Typically, a turkey hunter who would utilize the turkey call 10 wears a significant amount of dark or camouflage clothing and other hunting accessories in order to blend in with the surrounding hunting environment. This reduces the possibility prevents the hunter's location being revealed to the turkey or other game that is being sought. By providing for the turkey call 10 to have a striking plate 22 with a glare resistant striking surface 28, then the hunter's position or location will less likely be revealed, as would be the case if the striking plate 22 had a shiny or reflective surface.

Referring to FIG. 3, there is shown a sectional view of the striking plate 22 having the glare resistant striking surface 28. Preferably, the glare resistant striking surface 28 includes a glare resistant coating X. The particular color of the glare resistant coating X is preferably black, but may be any dark color combination or assortment of dark colors.

Preferably, the glare resistant striking surface 28 is obtained by exposing the striking plate 22 to an anodization process during which a colored dye material is adhered to the striking plate 22 to form the glare resistant coating X with dark color. However, it will be appreciated that a glare resistant striking surface may be obtained by other processes. Anodization is a process that is well known. The specific anodization process used to obtain the glare resistant striking surface 28 on the striking plate 22 may be as follows. First, the striking plate 22 is introduced to a bath of oil removing solutions and then dipped into a caustic bath. The striking plate is then deoxidized in a rinse solution and dipped in a sulfuric acid bath, at which time an electric current is introduced to the sulfuric acid bath for opening the pores of the striking plate 22. The striking plate 22 is then again rinsed in a clear water based solution. The striking plate 22 is next dipped into another bath containing a dye preferably of a dark color, such as, for example, "Sanodye MF Fast Black OA Powder" dye manufactured by Clariant Corporation, that provides the glare resistant coating X with dark color to form the glare resistant striking surface 28. Finally, the striking plate 22 is rinsed in a bath of nickel acetate that seals up the pores and prevents the black dye from fading.

It will be appreciated that one or more dark colors may be applied to the striking plate 22 such that the glare resistant striking surface 28 may include a single dark color or variations, combinations or assortments thereof to produce, for example, a camouflage pattern.

In accordance with another aspect of the invention, the glare resistant striking surface 28 of the striking plate 22 preferably includes a plurality of concentric grooves 40 formed therein. The grooves 40 allow for the user of the turkey call 10 to obtain a more consistent turkey sound when the striking end 36 of the rigid striking member 30 is placed into contact with and moved relative to the glare resistant striking surface 28, for example, in the direction of arrows A. This allows for the user to use the turkey call 10 in whatever position the turkey call 10 is being held by the user. In otherwords, the grooves 40, which are preferably circular as shown in the preferred embodiment of FIG. 1, allow for 360° use of the turkey call 10. Therefore, the user of the turkey call 10, may rely on the fact that contact and movement between the striking end 36 of the rigid striking member 30 and the glare resistant striking surface 28, in a manner as indicated by arrows A, will result in consistent turkey sounds being produced.

The grooves 40 formed in the glare resistant striking surface 28 also permit the turkey call 10 to be effectively used in all types of weather conditions. Specifically, the grooves 40 allow for moisture, such as rain or snow, to be received therein enabling the striking end 36 of the rigid striking member 30 to more fully contact the glare resistant striking surface 28.

The grooves 40 may be formed in the glare resistant striking surface 28 by using a known machining tool equipped with a proper cutting tool to form the grooves 40. Preferably, the grooves have a depth in the range of about 0.007 to 0.010 inches. In addition, the striking plate 22 preferably has a thickness in the range of about 0.0880 to 0.09375 inches. The diameter of the striking plate 22 is preferably in the range of about 3.0 to 5.0 inches, and more preferably in the range of about 3.488 to 3.498 inches.

It will also be appreciated, that the grooves are preferably formed in the glare resistant striking surface 28 prior to the described anodization process to obtain the glare resistant coating X with dark color, preferably by the anodization process described herein.

While not the preferred embodiment of the invention, a glare resistant coating can nevertheless be applied to a striking plate that does not include the grooves formed therein. For example, FIG. 4 sets forth a cross sectional view of a striking plate 22' having a glare resistant striking surface 28' due to a glare resistant coating X' with dark color being applied thereto.

It will be appreciated that the present invention provides an improved turkey call that includes a glare resistant striking surface. The glare resistant striking surface may also include a plurality of concentric grooves formed therein to allow for a more consistent artificial turkey sound to be produced by the turkey call.

Whereas particular embodiments of the invention have been described above for purposes of illustration, it will be appreciated by those skilled in the art that numerous variations of the details may be made without departing from the invention as described the appended claims.

What is claimed is:

1. A turkey call for cooperating with a rigid striking member to produce artificial turkey sounds, the turkey call comprising:

a housing including a base and sidewalls extending from said base, said sidewall terminating in a free edge, said base and said sidewall defining a sound chamber and said free edge defining an opening;

a striking plate configured to be received in said opening of said housing, said striking plate having a glare resistant striking surface that produces the turkey sounds when the rigid striking member is placed in contact with said glare resistant striking surface and moved relative thereto, wherein said glare resistant striking surface includes a plurality of concentric grooves formed therein; and said striking plate being composed of aluminum and being anodized to provide said glare resistant striking surface.

2. The turkey call of claim 1 wherein:

said glare resistant striking surface includes a glare resistant coating applied thereto while said striking plate is anodized.

3. The turkey call of claim 2 wherein said striking plate has a thickness in the range of about 0.0880 to 0.09375 inches.

4. The turkey call of claim 3 wherein said striking plate has a diameter in the range of about 3.0 to 5.0 inches.

5. The turkey call of claim 3 wherein said striking plate has a diameter in the range of about 3.488 to 3.498 inches.

6. A turkey call for cooperating with a rigid striking member to produce artificial turkey sounds, the turkey call comprising:

a housing including a base and sidewall extending from said base, said sidewall terminating in a free edge, said base and said sidewall defining a sound chamber and said free edge defining an opening;

a striking plate configured to be received in said opening of said housing, said striking plate having a glare resistant striking surface that produces the turkey sounds when the rigid striking member is placed into contact with said glare resistant striking surface and moved relative thereto;

said glare resistant striking surface includes a plurality of concentric grooves formed therein;

said plurality of concentric grooves are generally circular; and said plurality of concentric grooves have a depth in the range of about 0.007 to 0.010 inches.

7. A turkey call for cooperating with a rigid striking member to produce artificial turkey sounds, said turkey call comprising a housing including a base and sidewall extending from said base, said sidewall terminating in a free edge, said base and said sidewall defining a sound chamber and said free edge defining an opening;

a striking plate configured to be received in said opening of said housing and having a striking surface that produces the turkey sounds when the rigid striking member is placed into contact with said striking surface and moved relative thereto, said striking surface having a plurality of concentric grooves formed therein;

said striking plate is made of a material selected from the group consisting of aluminum and stainless steel;

said plurality of concentric grooves are generally circular; and said plurality of concentric grooves have a depth in the range of about 0.007 to 0.010 inches.

* * * * *